US009434169B2

(12) United States Patent
Kida et al.

(10) Patent No.: US 9,434,169 B2
(45) Date of Patent: Sep. 6, 2016

(54) INK JET RECORDING METHOD AND INK JET RECORDING APPARATUS

(71) Applicant: Seiko Epson Corporation, Tokyo (JP)

(72) Inventors: Hiroaki Kida, Shiojiri (JP); Hiroshi Fukumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/564,800

(22) Filed: Dec. 9, 2014

(65) Prior Publication Data

US 2015/0158304 A1 Jun. 11, 2015

(30) Foreign Application Priority Data

Dec. 9, 2013 (JP) ................................. 2013-253923

(51) Int. Cl.

| B41J 2/165 | (2006.01) |
|---|---|
| B41M 5/00 | (2006.01) |
| B41M 7/00 | (2006.01) |
| B41J 11/00 | (2006.01) |
| C09D 11/101 | (2014.01) |
| C09D 11/324 | (2014.01) |
| C09D 11/38 | (2014.01) |

(52) U.S. Cl.
CPC ......... *B41J 2/16538* (2013.01); *B41J 2/16552* (2013.01); *B41J 11/002* (2013.01); *B41M 5/0023* (2013.01); *B41M 7/0081* (2013.01); *C09D 11/101* (2013.01); *C09D 11/324* (2013.01); *C09D 11/38* (2013.01)

(58) Field of Classification Search
CPC .................................................... B41J 11/002
See application file for complete search history.

(56) References Cited

U.S. PATENT DOCUMENTS

| 6,306,502 B1* | 10/2001 | Fukushima et al. .......... 428/412 |
|---|---|---|
| 6,630,083 B1* | 10/2003 | Nunez .............. B29D 11/00442 264/1.36 |
| 8,011,299 B2* | 9/2011 | Vosahlo ..................... 101/424.1 |
| 2004/0099170 A1* | 5/2004 | Takabayashi ........ C09D 11/101 101/491 |
| 2006/0007290 A1* | 1/2006 | Oshima et al. ............... 347/102 |
| 2006/0066703 A1* | 3/2006 | Kadomatsu et al. ......... 347/102 |
| 2010/0129587 A1* | 5/2010 | Terauchi ..................... 428/65.1 |
| 2011/0026998 A1* | 2/2011 | Doo .............................. 400/621 |
| 2013/0072615 A1* | 3/2013 | Muro et al. .................. 524/406 |
| 2013/0137018 A1* | 5/2013 | Arayama et al. ................. 430/7 |

FOREIGN PATENT DOCUMENTS

JP 2011-178142 A 9/2011

\* cited by examiner

*Primary Examiner* — Stephen Meier
*Assistant Examiner* — John P Zimmermann
(74) *Attorney, Agent, or Firm* — Nutter McClennen & Fish LLP; John J. Penny, Jr.; Alex Nagorniy

(57) ABSTRACT

Disclosed herein is an ink jet recording method, including: scanning a recording medium with an ink jet head and simultaneously discharging an ultraviolet-curable ink composition for ink jet recording from the ink jet head to adhere the ink composition to the recording medium; irradiating the ultraviolet-curable ink composition for ink jet recording adhered to the recording medium with ultraviolet rays two times or more; and wiping a nozzle of the ink jet head, from which the ultraviolet-curable ink composition for ink jet recording has been discharged, using a nozzle wiping member.

22 Claims, 3 Drawing Sheets

INK JET RECORDING METHOD AND INK JET RECORDING APPARATUS

BACKGROUND

1. Technical Field

The present invention relates to an ink jet recording method and an ink jet recording apparatus.

2. Related Art

Ink jet recording methods have been rapidly developed in many areas because high-definition images can be recorded by a comparatively simple device. Among these methods, in an ink jet recording method of curing an ink composition by ultraviolet irradiation, various examinations have been conducted for the purpose of suppressing bleeding. For example, JP-A-2011-178142 discloses an ink jet printing method, in which printing is performed by discharging a first ink composition containing a first color material, a first polymerizable compound, and a first photopolymerization initiator and a second ink composition containing a second color material, a second polymerizable compound, and a second photopolymerization initiator onto a recording medium and then curing the ink compositions by light irradiation in order to improve printing characteristics by considering the sequence of a series of discharging and curing the plurality of ink compositions, in which the photocurability of the first ink composition is higher than that of the second ink composition, and in which the first ink composition is cured by discharging the first ink composition and irradiating the discharged first ink composition with light, and then the second ink composition is cured by discharging the second ink composition and irradiating the discharged second ink composition with light.

However, as mentioned in JP-A-2011-178142, there is a problem in that, even though bleeding is suppressed by discharging an ink composition in order of increasing curability and curing the discharged ink composition, when an ultraviolet irradiation light source having comparatively strong irradiation energy is disposed around a head, the influence of heat of the ultraviolet irradiation light source on the head increases, and thus the discharge stability of the ink composition readily deteriorates due to the cross-linked polymer of the ink composition. Further, there is a problem in that stripes extending in the transporting direction of a recording medium (hereinafter, referred to as "streaks") are generated.

Meanwhile, in the case where the irradiation energy of the ultraviolet irradiation light source is decreased in order to reduce the influence of heat, when an ink composition containing a hindered amine is used, there is a problem of generating wrinkles on the ink composition adhered to the recording medium. Meanwhile, when the ink composition does not contain a hindered amine as a polymerization inhibitor, there is also a problem of the storage stability of the ink composition markedly deteriorating. Further, when irradiation energy is low, the tackiness of the obtained recorded products deteriorates.

SUMMARY

An advantage of some aspects of the invention is to provide an inkjet recording method and an ink jet recording apparatus, by which the generation of bleeding, wrinkles, and streaks can be suppressed and cleaning resettability can be improved by using an ink composition having excellent storage stability.

The present inventors have made efforts to solve the above-mentioned problems. As a result, the present inventors have completed an ink jet recording method including predetermined processes using a predetermined ink composition.

[1] According to an aspect of the invention, there is provided an ink jet recording method, including: scanning a recording medium with an ink jet head and simultaneously discharging an ultraviolet-curable ink composition from the ink jet head to adhere the ink composition to the recording medium; irradiating the ultraviolet-curable ink composition adhered to the recording medium with ultraviolet rays two times or more; and wiping a nozzle of the ink jet head, from which the ultraviolet-curable ink composition has been discharged, using a nozzle wiping member, in which the ultraviolet-curable ink composition contains a color material, a polymerizable compound having a di- or higher functional (meth)acryloyl group, a photopolymerization initiator, and a hindered amine compound.

[2] In the ink jet recording method according to the above [1], the content of the hindered amine compound may be 0.005 mass % to 0.5 mass %, based on 100 mass % of the ultraviolet-curable ink composition.

[3] In the ink jet recording method according to the above [1] or [2], in the irradiating, first ultraviolet irradiation energy may be 2.5 mJ/cm$^2$ to 40 mJ/cm$^2$, and total ultraviolet irradiation energy may be 100 mJ/cm$^2$ to 1500 mJ/cm$^2$.

[4] In the ink jet recording method according to any one of the above [1] to [3], in the irradiating, at least a light source used in the first ultraviolet irradiation may be a semiconductor light source having a peak wavelength of 350 nm to 420 nm.

[5] In the ink jet recording method according to any one of the above [1] to [4], in the irradiating, at least a light source used in the first ultraviolet irradiation may be an LED having a peak wavelength of 350 nm to 420 nm.

[6] In the ink jet recording method according to any one of the above [1] to [5], the content of the polymerizable compound having a di- or higher functional (meth)acryloyl group may be 5 mass % to 60 mass %, based on 100 mass % of the ultraviolet-curable ink composition.

[7] In the ink jet recording method according to any one of the above [1] to [6], in the scanning, recording may be performed by scanning the recording medium one time with an ink jet head having a length equal to or greater than a recording width of the recording medium.

[8] In the ink jet recording method according to any one of the above [1] to [7], the ultraviolet-curable ink composition may contain a polymerizable compound having a tri- or higher functional (meth)acryloyl group.

[9] In the ink jet recording method according to any one of the above [1] to [8], in the wiping, the nozzle may be wiped by the nozzle wiping member using a cleaning liquid containing an alkylene glycol derivative.

[10] In the ink jet recording method according to any one of the above [1] to [9], the total of second and subsequent ultraviolet irradiation energy may be 8 times to 140 times the first ultraviolet irradiation energy.

[11] In the ink jet recording method according to any one of the above [1] to [10], the hindered amine compound may include a compound having a 2,2,6,6-tetramethylpiperidine-N-oxyl skeleton.

[12] According to another aspect of the invention, there is provided an ink jet apparatus, which performs recording by the ink jet method according to any one of the above [1] to [11].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
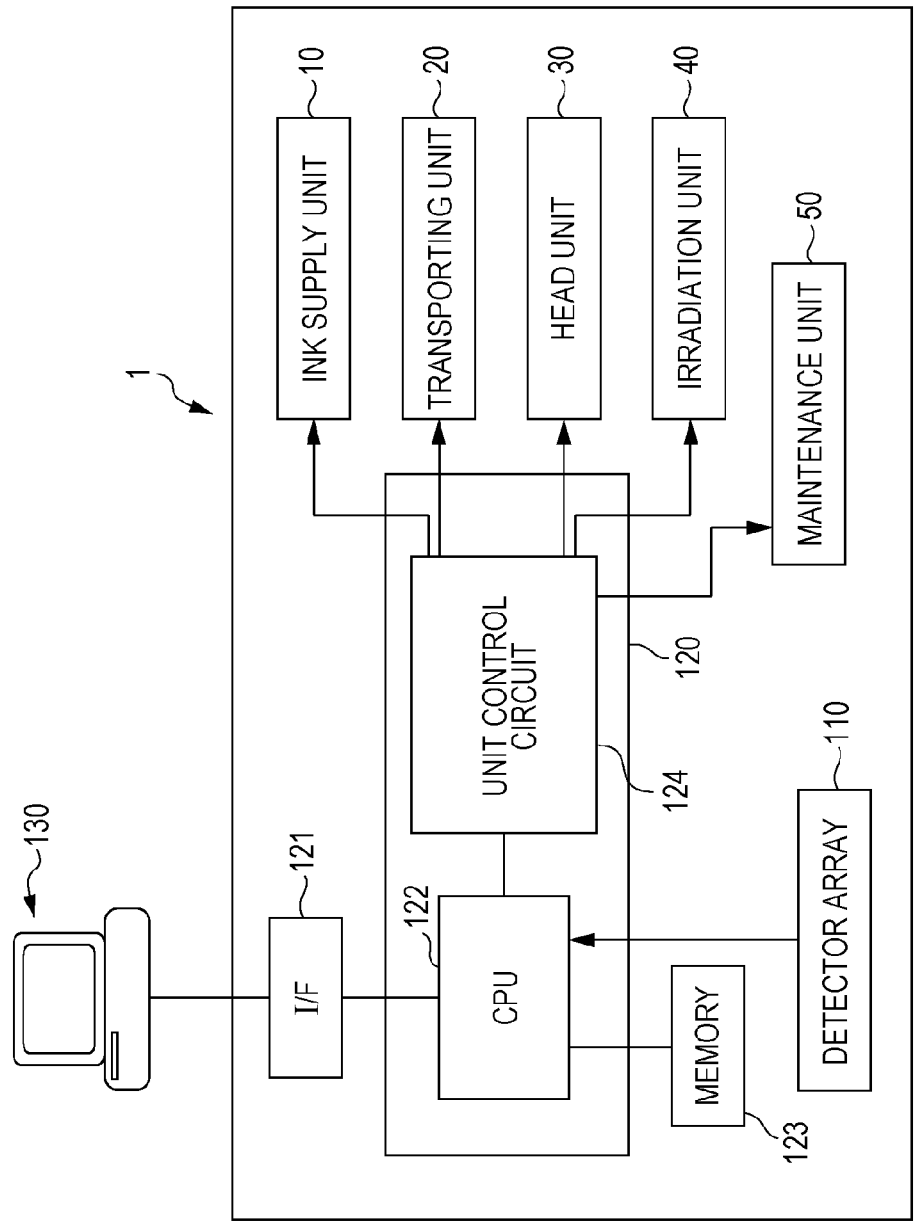
FIG. 1 is a block diagram showing an example of the configuration of an ink jet recording apparatus that can be used in the present embodiment.

Hereinafter, an embodiment of the invention (hereinafter, referred to as "present embodiment") will be described in detail with reference to the drawings as necessary, but the invention is not limited thereto. Various modifications can be made within the scope not departing from the gist thereof. In the drawings, the same elements are given the same reference numerals and the description thereof will not be repeated. In addition, the positional relation such as top, bottom, left, and right is based on the positional relation shown in the drawings unless otherwise specified. Furthermore, the ratio of the dimensions is not limited to the ratio shown in the drawings. Moreover, in the present specification, "(meth)acryl" means "acryl" and "methacryl" corresponding thereto, and "(meth)acrylate" means "acrylate" and "methacrylate" corresponding thereto.

Ink Jet Recording Method

The ink jet recording method according to the present embodiment includes: a discharge process of scanning a recording medium with an ink jet head (hereinafter, referred to as "a head") and simultaneously discharging an ultraviolet-curable ink composition (hereinafter, referred to as "an ink composition") from the ink jet head to adhere the ink composition to the recording medium; an ultraviolet irradiation process of irradiating the ultraviolet-curable ink composition adhered to the recording medium with ultraviolet rays two times or more; and a cleaning process of wiping a nozzle of the ink jet head, from which the ultraviolet-curable ink composition has been discharged, using a nozzle wiping member. Here, the ultraviolet-curable ink composition includes a color material, a polymerizable compound having a di- or higher functional (meth)acryloyl group, a photopolymerization initiator, and a hindered amine compound.

In the ink jet recording method for curing the ink composition by applying ultraviolet rays, it is preferred that the ink composition be rapidly cured after it adheres to the recording medium in terms of suppressing bleeding. However, there are several problems in arranging ultraviolet irradiation light sources having irradiation energy for sufficiently curing the ink composition around the head. For example, it is difficult to provide a space for disposing the ultraviolet irradiation light sources around the head, nozzles are easily clogged by the great influence of heat of the ultraviolet irradiation light sources on the head, and, in the case of multicolor printing, a comparatively large ultraviolet irradiation light source is required with respect to a head of each color, thus increasing the cost of the ultraviolet irradiation light source.

Meanwhile, it is considered that an ultraviolet irradiation light source (light source for temporary curing) having comparatively low irradiation energy be disposed around the head, and simultaneously another ultraviolet irradiation light source (light source for main curing) having comparatively high irradiation energy be disposed far away from the head to such a degree that heat of this ultraviolet irradiation light source does not influence the head. In this case, temporary curing for suppressing bleeding is conducted, and then main curing for completely curing the ink composition is conducted (multistep irradiation).

Meanwhile, in order to secure the storage stability of the ink composition, generally, the ink composition is required to contain a polymerization inhibitor such as a hindered amine. However, the ink composition containing a hindered amine is problematic in that wrinkles are easily generated on the surface of a cured film when temporary curing is conducted using comparatively low irradiation energy. Therefore, in order to solve the problem, an ink composition containing a polymerizable compound having a di- or higher functional (meth)acryloyl group was used, thus reducing the generation of wrinkles.

However, even when a light source for temporary curing, disposed around the head, is used, a problem reoccurs in that a crosslinkable polymer is formed in the vicinity of a nozzle and abnormal discharge is observed when an ink composition containing a highly-crosslinkable polymerizable compound having a di- or higher functional (meth)acryloyl group is used. The crosslinkable polymer derives from the polymerization of the ink composition attributable to the direct or indirect radiation of light leaked from the ultraviolet light irradiation source to the surface of the nozzle. When the crosslinkable polymer is formed around the nozzle, it is difficult to overcome abnormal discharge by the discharge of the ink composition using flushing or suction.

Therefore, in the ink jet recording method according to the present embodiment, when a cleaning process of wiping the nozzle using a nozzle wiping member is additionally employed, cleaning resettability can be accomplished, and the abnormal discharge can be overcome. As described above, when an ink composition having good storage stability is used, it is possible to suppress the generation of tackiness, bleeding, wrinkles, and streaks, and an ink jet recording method, which is excellent even in cleaning resettability, can be provided. Hereinafter, the ink jet recording method according to the present embodiment will be described in more detail.

Discharge Process

The discharge process is a process of scanning a recording medium with an ink jet head and simultaneously discharging an ultraviolet-curable ink composition for ink jet recording from the ink jet head to adhere the ink composition to the recording medium.

FIG. 1 is a block diagram showing an example of the configuration of an ink jet recording apparatus that can be used in the present embodiment. As shown in FIG. 1, a printer driver is installed in a computer 130, and, in order to record an image in a printer 1, print data corresponding to such an image is output to the printer 1. The printer 1 includes an ink supply unit 10, a transporting unit 20, a head unit 30, an irradiation unit 40, a detector array 110, a memory 123, an interface 121, a maintenance unit 50, and a controller 120. The controller 120 includes a CPU 122 and a unit control circuit 124. In the printer 1 receiving print data from the computer 130 (external device), each unit is controlled by the controller 120, and an image is recorded on a recording medium in accordance with the print data. The circumstances in the printer 1 are monitored by the detector array 110, and the detector array 110 outputs detection results to the controller 120. The controller 120 controls each unit based on the detection results output from the detector array 110, and stores the print data input through the interface 121 in the memory 123. In the memory 123, control information for controlling each unit is also stored.

Ink Jet Head

The head unit 30 of the ink jet recording apparatus (printer 1) is provided with a head (ink jet head) for discharging an ink composition onto a recording medium and performing recording. This head includes cavities for discharging the contained ink composition through a nozzle, a discharge driving unit provided with respect to each cavity and imparting a driving force for discharging ink, and a nozzle provided with respect to each cavity and discharging the ink composition to the outside of the head. The cavities, the discharge driving unit provided with respect to each cavity, and the nozzle provided with respect to each cavity may be each independently provided in one head in a plural number. The discharge driving unit can be formed using an electro-mechanical conversion element such as piezoelectric element for changing the volume of the cavity by mechanical deformation, or using an electrothermal conversion element for generating bubbles in ink by heating. The ink jet recording apparatus may be provided with one head or a plurality of heads based on ink of one color. When a plurality of heads is provided, the plurality of heads are arranged in the width direction of a recording medium, thereby constituting a line head. In this case, the width of the recording medium can be increased. When recording is performed using ink compositions of multiple colors, the ink jet recording apparatus is provided with a head with respect to each ink. For example, this head may be a head shown in FIG. 3 of JP-A-2009-279830.

In the discharge process, recording is preferably performed by scanning a recording medium once with a line head having a width equal to or greater than a recording width of the recording medium. That is, the recording is preferably performed using a line printer for one-pass printing. A serial printer for attaching the dots of adjacent pixels by separate passes and performing ultraviolet irradiation with respect to each pass may also be used. However, when a line printer (one-pass printing) for attaching all dots and performing ultraviolet irradiation by one pass is used, there is a general tendency of easily generating bleeding and wrinkles. For this reason, in the ink jet recording method using a line printer, the invention is particularly usefully used.

The line printer, which is a line-type ink jet recording apparatus, is provided with a line head having a length equal to or greater than the length corresponding to the width of a recording medium. The ink composition is discharged from the line head toward the recording medium while the position of the line head is relatively moved in a scanning direction where the line head intersects the width direction of the recording medium. That is, the ink composition is discharged from the line head toward the recording medium relatively scanned with the line head. Meanwhile, in the line printer, the head thereof is fixed without moving, and recording is performed by one pass (single pass). The line printer is advantageous compared to a serial printer in the point that a recording speed is rapid.

Here, in the above-mentioned "line head having a width equal to or greater than the recording width of the recording medium", the width of the recording medium and the length (width) of the line head may be different from each other as well as being completely the same as each other. As the case where they are different from each other, for example, there is a case where the length (width) of the line head is approximately the width (recording width) of the recording medium to which the ink composition should be discharged (an image should be recorded).

On the other hand, in a serial printer that is a serial-type ink jet recording apparatus, the head thereof performs a main scanning (pass) for discharging an ink composition while moving in a main scanning direction intersecting the sub-scanning direction of a recording medium, and recording is generally performed by two passes or more (multi-pass).

Figure 2:
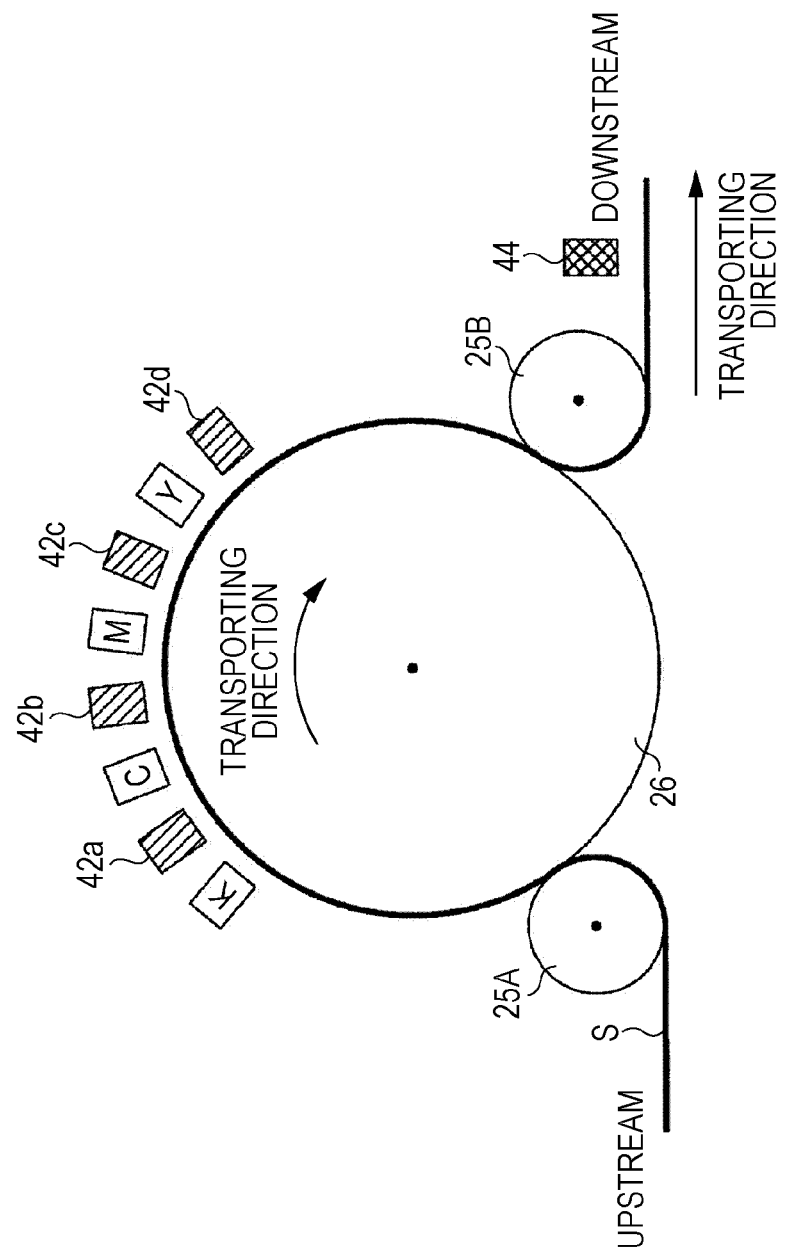
FIG. 2 is a schematic cross-section view showing an example of the arrangement of a head unit, a transportation unit, and an irradiation unit in a line printer, which is an example of the ink jet recording apparatus that can be used in the present embodiment.

Hereinafter, a line printer, which is an example of an ink jet recording apparatus used in the present embodiment, will be described in detail with reference to FIG. 2. In FIG. 2 used in the following description, the scale reduction of each member is appropriately changed in order for each member to have a recognizable size.

Line Printer

FIG. 2 is a schematic cross-section view showing an example of the arrangement of a head unit, a transportation unit, and an irradiation unit in a line printer, which is an example of the ink jet recording apparatus that can be used in the present embodiment.

A transporting roller array consisting of an upstream roller 25A and a downstream roller 25B is rotated by a transporting motor (not shown), and a transporting drum 26 is driven by the transporting roller array. A recording medium S is transported with the rotation of the transporting roller array along the peripheries of the transporting roller array 25A and 25B and the periphery of the transporting drum 26 that is a support. Each line head consisting of a head K, a head C, a head M, and a head Y is disposed around the transporting drum 26 such that it faces the transporting drum 26.

The transporting drum 26 has a surface for transporting a recording medium S, supports the recording medium S on the surface, and moves relative to a head. When the transporting drum 26 moves relative to the head while supporting the recording medium S, the time (period) taken for the transporting drum 16 to return to the same position from any position is preferably equal to or longer than 5 seconds, and more preferably equal to or longer than 6 seconds. If this time is within the above range, the heat radiation time for a support can be secured, and the temperature rise thereof can be suppressed. Further, the upper limit of the period is not particularly restricted, but, in order to realize high-speed printing, for example, the upper limit thereof is preferably equal to or shorter than 15 seconds.

Further, preferably, the movement of the transporting drum 26 by the support in the predetermined period may be conducted at least while ink jet recording is performed, and the movement thereof may be also conducted continuously or intermittently while the ink jet recording is performed.

In the shape of the support, the support is not limited to the drum-shaped support shown in FIG. 2. For example, the support may be a roller-shaped support, a belt-shaped support, or a plate-shaped support (platen or the like) for supporting the recording medium S. In the movement of the support relative to the head, the support may move (rotate) in one direction and thus return to the same position, and may also return to the same position by a combination of movement in one direction and movement back in another direction. In the latter, the movement of the support in one direction is set to a movement associated with recording onto a single-sheet recording medium, and the movement back of the support in another direction is set to a movement for performing recording onto one recording medium and then performing recording onto the following recording medium.

Meanwhile, in the case of a serial printer, the movement of the support in any one direction corresponds to sub-scanning. Further, the movement of the support relative to the head may include the movement of the support relative to the head may a movement of the head relative to the support.

The raw materials of the support are not particularly limited. Examples of the raw materials thereof may include metal, resin, and rubber. Among these raw materials, metal is preferable. When the support is made of metal, unlike a polymer material such as rubber, the degradation of the support attributable to heat and cracks which could be expected do not occur even though the support may be used for a long period of time. Therefore, this support can be used for a long period of time. Examples of the metal may include, but are not limited to, aluminum, stainless steel, copper, iron, and alloys thereof. Moreover, a surface of this metal-made support, that is, the transporting surface of the recording medium S may be coated with a coating agent. When this coated support is used, compared to when a non-coated support is used, the surface hardness thereof is therefore improved, and slippage between this support and the recording medium becomes difficult. The coating agent is not particularly limited. Examples of the coating agent may include organic coating agents such as resin and the like, inorganic coating agents such as inorganic compounds, and combinations thereof. Meanwhile, the matters relating to the above-mentioned support can be applied to a serial printer as well as a line printer.

As described above, recording is performed by the discharge operation of discharging and attaching an ink composition onto the recording medium S facing each line head.

Ultraviolet-Curable Ink Composition

The ultraviolet-curable ink composition contains a color material, a polymerizable compound having a di- or higher functional (meth)acryloyl group, a photopolymerization initiator, and a hindered amine compound.

Color Material

The color material is not particularly limited, but examples thereof include a pigment and a dye.

The inorganic pigment is not particularly limited, but examples thereof include carbon blacks (C. I. pigment black 7) such as furnace black, lamp black, acetylene black and channel black, iron oxides, and titanium oxides.

The organic pigment is not particularly limited, but examples thereof include quinacridone-based pigment, quinacridonequinone-based pigment, dioxazine-based pigment, phthalocyanine-based pigment, anthrapyrimidine-based pigment, anthanthrone-based pigment, indanthrone-based pigment, flavanthrone-based pigment, perylene-based pigment, diketopyrrolopyrrole-based pigment, perinone-based pigment, quinophthalone-based pigment, anthraquinone-based pigment, thioindigo-based pigment, benzimidazolone-based pigment, isoindolinone-based pigment, azomethine-based pigment, and azo-based pigment.

The pigment may be used independently or in a combination of two or more thereof.

The content of the color material is preferably 0.5 mass % to 20 mass %, more preferably 0.5 mass % to 15 mass %, still more preferably 1 mass % to 10 mass %, and particularly preferably 1 mass % to 5 mass %. When the content of the color material is within the above range, a color developing property tends to be better.

When the ultraviolet-curable ink composition contains a pigment as the color material, the content of the pigment may be equal to that of the color material.

As the dye, an acidic dye, a direct dye, a reactive dye and a basic dye may be used without limitation. Examples of the dye include C. I. acid yellows 17, 23, 42, 44, 79, and 142, C. I. acid reds 52, 80, 82, 249, 254, and 289, C. I. acid blues 9, 45 and 249, C. I. acid blacks 1, 2, 24, and 94, C. I. food blacks 1 and 2, C. I. direct yellows 1, 12, 24, 33, 50, 55, 58, 86, 132, 142, 144, and 173, C. I. direct reds 1, 4, 9, 80, 81, 225 and 227, C. I. direct blues 1, 2, 15, 71, 86, 87, 98, 165, 199, and 202, C. I. direct blacks 19, 38, 51, 71, 154, 168, 171, and 195, C. I. reactive reds 14, 32, 55, 79, and 249, and C. I. reactive blacks 3, 4, and 35.

The dye may be used independently or in a combination of two or more thereof.

The content of the dye is preferably 1 mass % to 20 mass %, based on 100 mass % of the ink composition, in order to obtain excellent concealment and color reproducibility.

Polymerizable Compound Having Di- or Higher Functional (Meth)acryloyl Group

The polymerizable compound having a di- or higher functional (meth)acryloyl group is not particularly limited, but includes a polymerizable compound having a di-functional (meth)acryloyl group and a polymerizable compound having a tri- or higher functional (meth)acryloyl group. Examples of the polymerizable compound having a di- or higher functional (meth)acryloyl group include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, ethylene oxide (EO) adducts of bisphenol A di(meth)acrylate, propylene oxide (PO) adducts of bisphenol A di(meth)acrylate, hydroxypivalic acid neopentyl glycol di(meth)acrylate, and polytetramethylene glycol di(meth)acrylate. In addition, examples thereof further include the following polymerizable compounds having a tri- or higher functional (meth)acryloyl group.

The content of the polymerizable compound having a di- or higher (meth)acryloyl group is preferably 5 mass % to 60 mass %, more preferably 15 mass % to 45 mass %, and still more preferably 20 mass % to 40 mass %, based on 100 mass % of the ink composition. When the content thereof is within the above range, curability, storage stability, discharge stability, and cleaning resettability tend to be better, and wrinkles or streaks tend to be further suppressed.

Polymerizable Compound Having Tri- or Higher Functional (Meth)acryloyl Group

It is preferable that the ink composition contain a polymerizable compound having a tri- or higher functional (meth)acryloyl group. When the ink composition contains the polymerizable compound having a tri- or higher functional (meth)acryloyl group, the curability, anti-bleeding property, and tackiness of the ink composition tend to be further improved, and the generation of wrinkles tends to be further suppressed. In contrast, there is a problem in that it is difficult to overcome the abnormal discharge of the ink composition because the crosslinkability thereof is higher. However, according to the present embodiment including a cleaning process, the abnormal discharge can be overcome by maintaining cleaning resettability, and simultaneously the advantages of the polymerizable compound having a tri- or higher functional (meth)acryloyl group can be exhibited.

The polymerizable compound having a tri- or higher functional (meth)acryloyl group is not particularly limited, but examples thereof include trimethylolpropane tri(meth) acrylate, EO-modified trimethylolpropane tri(meth)acrylate, pentaerythritol tri(meth)acrylate, pentaerythritol tetra(meth) acrylate, dipentaerythritol hexa(meth)acrylate, ditrimethylolpropane tetra(meth)acrylate, glycerine propoxy tri(meth) acrylate, caprolactone-modified trimethylolpropane tri (meth)acrylate, pentaerythritolethoxy tetra(meth)acrylate, and caprolactam-modified dipentaerythritol hexa(meth) acrylate.

The content of the polymerizable compound having a tri- or higher functional (meth)acryloyl group is preferably 5 mass % to 20 mass %, more preferably 5 mass % to 15 mass %, and still more preferably 10 mass % to 15 mass %, based on 100 mass % of the ink composition. When the content thereof is within the above range, the curability, anti-bleeding property, and tackiness of the ink composition tend to be further improved, and the generation of wrinkles tends to be further suppressed.

Other Photopolymerizable Compounds

The ink composition may contain other photopolymerizable compounds. The photopolymerizable compound is polymerized independently or by the action of a photopolymerization initiator during light irradiation, thus curing the ink composition applied on the recording medium. The photopolymerizable compound is not particularly limited, but, specifically, commonly-known mono-functional and multi-functional monomers and oligomers can be used. The photopolymerizable compound may be used independently or in a combination of two or more thereof. Hereinafter, examples of the photopolymerizable compound will be illustrated.

The mono-functional and multi-functional monomers are not particularly limited, but examples thereof include: unsaturated carboxylic acids such as (meth)acrylic acid, itaconic acid, crotonic acid, isocrotonic acid, and maleic acid; salts of the unsaturated carboxylic acids; esters of unsaturated carboxylic acids containing a vinyl ether group such as 2-(2-vinyloxyethoxy)ethyl acrylate, urethane, amides, and anhydrides; mono-functional (meth)acrylates having an aromatic ring, such as acrylonitrile, styrene, or phenoxyethyl acrylate; mono-functional (meth)acrylates having an alicyclic ring, such as isobornyl acrylates; and various unsaturated polyesters, unsaturated polyethers, unsaturated polyamides, and unsaturated urethane. Further, the mono-functional and multi-functional oligomers are not particularly limited, but examples thereof include oligomers formed from the above-mentioned monomers, such as linear acrylic oligomers, epoxy (meth)acrylate, oxetane (meth) acrylate, aliphatic urethane (meth)acrylates, aromatic urethane (meth)acrylates, and polyester (meth)acrylates.

Further, as another mono-functional monomer or multi-functional monomer, an N-vinyl compound may be used. The N-vinyl compound is not particularly limited, but examples thereof include N-vinyl formamide, N-vinyl carbazole, N-vinyl acetamide, N-vinyl pyrrolidone, N-vinyl caprolactam, acryloyl morpholine, and derivatives thereof.

When the ink composition contains a mono-functional monomer, the content of the mono-functional monomer in the ink composition is preferably 10 mass % to 70 mass %, more preferably 20 mass % to 60 mass %, and still more preferably 20 mass % to 50 mass %, in terms of low viscosity, curability, photopolymerizability and solubility of the ink composition.

Photopolymerization Initiator

The photopolymerization initiator included in the ink composition may be used without limitation as long as it produces active species such as radicals and cations due to light energy such as ultraviolet light and initiates the polymerization of the above-mentioned polymerizable compound. However, a radical polymerization initiator and a cationic polymerization initiator may be used, and, among these polymerization initiators, a radical polymerization initiator may be preferably used.

The radical phtopolymerization initiator is not particularly limited, but examples thereof include a thioxanthone-based photopolymerization initiator, an acylphosphine oxide-based photopolymerization initiator, aromatic ketones, aromatic onium salt compounds, organic peroxides, thio compounds (thiophenyl group-containing compounds, and the like), an α-aminoalkylphenone compound, a hexaarylbiimidazole compound, a ketoxime ester compound, a borate compound, an azinium compound, a metallocene compound, an active ester compound, a compound having a carbon-halogen bond, and an alkylamine compound.

The thioxanthone-based photopolymerization initiator is not particularly limited. Specifically, it is preferable that the thioxanthone-based photopolymerization initiator include one or more selected from the group consisting of thioxanthone, diethyl thioxanthone, isopropyl thioxanthone, and chlorothioxanthone. Meanwhile, although not particularly limited, it is preferable that 2,4-diethyl thioxanthone be used as the diethyl thioxanthone, 2-isopropyl thioxanthone be used as the isopropyl thioxanthone, and 2-chlorothioxanthone be used as the chlorothioxanthone. When the ink composition containing this thioxanthone-based photopolymerization initiator is used, surface tackiness can be reduced, and, particularly, at the time of formation of a thin film easily affected by oxygen inhibition, the surface of ink is cured, thereby preventing the color mixing and exudation among dots. Furthermore, this ink composition tends to be better in curability, storage stability, and discharge stability. Among these photopolymerization initiators, the thioxanthone-based photopolymerization initiator containing diethyl thioxanthone is preferably used. When the thioxanthone-based photopolymerization initiator contains diethyl thioxanthone, ultraviolet light (UV light) in a wide range can be more efficiently converted into active species.

Commercially available products of the thioxanthone-based photopolymerization initiator are not particularly limited, but specific examples thereof include Speedcure DETX (2,4-diethyl thioxanthone) and Speedcure ITX (2-isopropyl thioxanthone) (hereinbefore, manufactured by Lambson Ltd.), and KAYACURE DETX-S (2,4-diethyl thioxanthone) (manufactured by Nippon Kayaku Co., Ltd.).

The acylphosphine oxide-based photopolymerization initiator is not particularly limited, but specific examples of thereof include bis(2,4,6-trimethylbenzoyl)-phenylphosphine oxide, 2,4,6-trimethylbenzoyl-diphenyl-phosphine oxide, and bis-(2,6-dimethoxybenzoyl)-2,4,4-trimethylpentylphosphine oxide. This acylphosphine oxide-based photopolymerization initiator is easily affected by oxygen inhibition, but is suitable for curing with an LED emitting long-wavelength light. Therefore, when an acylphosphine oxide-based photopolymerization initiator is combined with a thioxanthone-based photopolymerization initiator, it is advantageous to a curing process using UV-LED, and the curability and adhesivity of the ink composition tend to become better.

Commercially available products of the acylphosphine oxide-based photopolymerization initiator are not particularly limited, but examples thereof include Irgacure 819 (bis(2,4,6-trimethylbenzoyl)-phenylphosphine oxide) and Irgacure TPO (2,4,6-trimethylbenzoyl-diphenyl-phosphine oxide).

Other radical photopolymerization initiators are not particularly limited, but examples thereof include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, and 2-methyl-1-[4-(methylthio)phenyl]-2-morpholino-propane-1-one.

Commercially available products of the radical photopolymerization initiator are not particularly limited, but examples thereof include Irgacure 651 (2,2-dimethoxy-1,2-diphenylethan-1-one), Irgacure 184 (1-hydroxy-cyclohexyl-phenyl-ketone), DAROCUR 1173 (2-hydroxy-2-methyl-1-phenyl-propan-1-one), Irgacure 2959 (1-[4-(2-hydroxyethoxy)-phenyl]-2-hydroxy-2-methyl-1-propan-1-one), Irgacure 127 (2-hydroxy-1-{4-[4-(2-hydroxy-2-methyl-propionyl)-benzyl]phenyl}-2-methyl-propan-1-one), Irgacure 907 (2-methyl-1-(4-methylthiophenyl)-2-morpholinopropan-1-one), Irgacure 369 (2-benzyl-2-dimethylamino-1-(4-morpholinophenyl)-butanone-1-butanone), Irgacure 379 (2-(dimethylamino)-2-[(4-methylphenyl)methyl]-1-[4-(4-morpholinyl)phenyl]-1-butanone), Irgacure 784 (bis(η5-2,4-cyclopentadiene-1-yl)-bis(2,6-difluoro-3-(1H-pyrrol-1-yl)-phenyl)titanium), Irgacure OXE 01 (1,2-octanedione, 1-[4-(phenylthio)-, 2-(O-benzoyloxime)]), Irgacure OXE 02 (ethanone, 1-[9-ethyl-6-(2-methylbenzoyl)-9H-carbazole-3-yl]-, 1-(O-acetyloxime)), Irgacure 754 (a mixture of oxyphenyl acetate and 2-[2-oxo-2-phenylacetoxyethoxy]ethyl ester and a mixture of oxyphenyl acetate and 2-(2-hydroxyethoxy)ethyl ester) (hereinbefore, manufactured by BASF Corporation), Speedcure TPO (manufactured by Lambson Ltd.), Lucirin TPO, LR8893, and LR8970 (hereinbefore, manufactured by BASF Corporation), and Ubecryl P36 (manufactured by UCB Corporation).

Other cationic photopolymerization initiators are not particularly limited, but specific examples thereof include sulfonium salts and iodonium salts.

Commercially available products of the cationic photopolymerization initiator are not particularly limited, but specific examples thereof include Irgacure 250 and Irgacure 270.

The photopolymerization initiator may be used independently or in a combination of two or more thereof.

The content of the photopolymerization initiator is preferably 2.5 mass % to 20 mass %, more preferably 2 mass % to 15 mass %, still more preferably 5 mass % to 15 mass %, and particularly preferably 5 mass % to 12 mass %, based on 100 mass % of the ink composition. When the content thereof is within the above range, a sufficient ultraviolet curing rate can be exhibited, and the undissolved residue of the photopolymerization initiator or the coloration derived from the photopolymerization initiator can be avoided.

Hindered Amine Compound

The ink composition of the present embodiment includes a hindered amine compound. Generally, when the amount of dissolved oxygen in an ultraviolet-curable ink composition is low, it is difficult to obtain an effect of suppressing the polymerization (dark reaction) of ink by oxygen, and thus storage stability tends to deteriorate. However, when a hindered amine-based polymerization inhibitor is contained in the ink composition, the storage stability of the ink composition can be secured even though the amount of dissolved oxygen is low.

The hindered amine compound is not particularly limited, but examples thereof include a compound having a 2,2,6,6-tetramethylpiperidine-N-oxyl skeleton, a compound having a 2,2,6,6-tetramethylpiperidine skeleton, a compound having a 2,2,6,6-tetramethylpiperidine-N-alkyl skeleton, and a compound having a 2,2,6,6-tetramethylpiperidine-N-acyl skeleton.

Examples of commercially available products of the hindered amine compounds include ADEKASTAB LA-7RD (2,2,6,6-tetramethyl-4-hydroxypiperidine-1-oxyl) (trade name, manufactured by ADEKA Corporation), IRGASTAB UV10 (4,4'-[1,10-dioxo-1,10-decanediyl)bis(oxy)]bis[2,2,6,6-tetramethyl]-1-piperidinyloxy) (CAS 2516-92-9), and TINUVIN 123 (4-hydroxy-2,2,6,6-tetramethylpiperidine-N-oxyl) (hereinbefore, manufactured by BASF Corporation), FA-711HM, and FA-712HM (2,2,6,6-tetramethylpiperidinyl methacrylate) (trade name, manufactured by Hitachi Chemical Co., Ltd.), TINUVIN 111FDL, TINUVIN 144, TINUVIN 152, TINUVIN 292, TINUVIN 765, TINUVIN 770DF, TINUVIN 5100, SANOL LS-2626, CHIMASSORB 119FL, CHIMASSORB 2020FDL, CHIMASSORB 944FDL, and TINUVIN 622LD (hereinbefore, trade name, manufactured by BASF Corporation), LA-52, LA-57, LA-62, LA-63P, LA-68LD, LA-77Y, LA-77G, LA-81, LA-82 (1,2,2,6,6-pentamethyl-4-piperidyl methacrylate), and LA-87 (hereinbefore, trade name, manufactured by ADEKA Corporation).

Among the commercially available products of the hindered amine compounds, LA-82 is a compound having a 2,2,6,6-tetramethylpiperidine-N-methyl skeleton, and each of ADEKASTAB LA-7RD and IRGASTAB UV10 is a compound having a 2,2,6,6-tetramethylpiperidine-N-oxyl skeleton.

Among the above hindered amine compounds, a compound having a 2,2,6,6-tetramethylpiperidine-N-oxyl skeleton may be preferably used, because it maintains excellent curability of the ink composition and further improves the storage stability of the ink composition.

Specific examples of the compound having a 2,2,6,6-tetramethylpiperidine-N-oxyl skeleton include, but are not limited to, 2,2,6,6-tetramethyl-4-hydroxypiperidine-1-oxyl, 4,4'-[1,10-dioxo-1,10-decanediyl)bis(oxy)]bis[2,2,6,6-tetramethyl]-1-piperidinyloxy, 4-hydroxy-2,2,6,6-tetramethylpiperidine-N-oxyl, bis(1-oxyl-2,2,6,6-tetramethylpiperidiny-4-yl)sebacate, and bis(2,2,6,6-tetramethyl-1-(octyloxy)-4-piperidinyl) decanedioate ester.

The hindered amine compound may be used independently or in a combination of two or more thereof.

The content of the hindered amine compound is preferably 0.001 mass % to 1 mass %, based on 100 mass % of the ink composition. The lower limit of the content of the hindered amine compound is more preferably equal to or more than 0.005 mass %, still more preferably equal to or more than 0.025 mass %, and particularly preferably equal to or more than 0.05 mass %. Further, the upper limit of the content of the hindered amine compound is more preferably equal to less than 0.7 mass %, still more preferably equal to less than 0.6 mass %, particularly preferably equal to less than 0.5 mass %, and further still more preferably equal to less than 0.3 mass %, and particularly preferably equal to less than 0.1 mass %. When the content of the hindered amine compound is equal to or more than 0.001 mass %, the storage stability of the ink composition can be further improved. Further, when the content of the hindered amine compound is equal to or less than 1 mass %, the curability of the ink composition and the suppression of wrinkles tends to be better.

Other Components

According to the ink composition used in the present embodiment, in order to maintain good storage stability and discharge stability from a head, to overcome clogging or to prevent the degradation of the ink composition, various additives, such as a dispersant, a surfactant, a penetrating agent, a moisturizer, a dissolution aid, a viscosity modifier, a pH adjuster, an antioxidant, an antiseptic agent, an antimold agent, a corrosion inhibitor, a polymerization inhibitor (for example, p-methoxyphenol) other than described above, a chelating agent for capturing metal ions influencing dispersion, and the like, may be suitably added to the ink composition.

Recording Medium

As the recording medium, for example, an absorptive or non-absorptive recording medium is used. The ink jet recording method can be widely applied to recording media having various absorption performances, from a non-absorptive recording medium, into which a water-soluble ink composition does not easily permeate, to an absorptive recording medium, into which a water-soluble ink composition does not easily permeate. However, when an ink composition is applied to a non-absorptive recording medium, a drying process may be required after curing the ink composition by ultraviolet irradiation.

Examples of the absorptive recording medium include, but are limited to, plain paper such as electrophotographic paper having high ink permeability, ink jet paper (dedicated ink jet paper provided with an ink absorbing layer made of silica particles or alumina particles or an ink absorbing layer made of a hydrophilic polymer such as polyvinyl alcohol (PVA) or polyvinyl pyrrolidone (PVP), art paper having comparatively low ink permeability and used in general offset printing, coat paper, and cast paper.

Examples of the non-absorptive recording medium include, but are limited to, a film or plate made of plastics such as polyvinyl chloride, polyethylene, polypropylene, and polyethylene terephthalate (PET), a plate made of metals such as iron, silver, copper, and aluminum, a metal plate fabricated by the deposition of these various metals, a film made of plastic, and a plate made of an alloy of stainless steel or brass.

Ultraviolet Irradiation Process

The ultraviolet irradiation process is a process of irradiating the ink composition adhered to the recording medium with ultraviolet rays two times or more. Ultraviolet rays (ultraviolet light) are emitted from a light source, and are then applied to the ink composition adhered to the recording medium, thereby curing the ink composition. In the ultraviolet irradiation process, the photopolymerization initiator contained in ink is decomposed by the irradiation of ultraviolet rays to generate initiation species such as radicals, acids, and bases, and the polymerization reaction of a polymerizable compound is accelerated by the function of the initiation species. Or, in the ultraviolet irradiation process, the polymerization reaction of a polymerizable compound is initiated by the irradiation of ultraviolet rays.

In the ultraviolet irradiation process, ultraviolet rays are applied two times or more. Among the two or more times of ultraviolet irradiation, ultraviolet irradiation for temporary curing may be conducted at least one time, and, particularly, it is preferable that the first ultraviolet irradiation be ultraviolet irradiation for temporary curing. Here, the term "temporary curing" means the temporary fixing (pinning) of the ink composition, and more specifically means that the ink composition is cured prior to the main curing of the ink composition in order to prevent the exudation between dots or control the diameter of dots. Generally, the polymerization degree of a polymerizable compound in the temporary curing is lower than the polymerization degree of the polymerizable compound in the main curing performed after the temporary curing. Further, the term "main curing" refers to curing the dots formed on the recording medium until they reach a cured state necessary for the use of recorded products. Here, in the present specification, the term "curing" means the main curing unless particularly mentioned. It is preferred that multiple ultraviolet irradiations be performed in one pass (one scanning).

As shown in FIG. 2 showing an example of the ink jet recording apparatus used in the present embodiment, irradiation units 42a, 42b, 42c, and 42d for temporary curing are disposed at the downstream of each line head in a transporting direction. In the ultraviolet irradiation process using this recording apparatus, these irradiation units 42a, 42b, 42c and 42d for temporary curing irradiate the recording medium S with ultraviolet radiation. Further, an irradiation unit 44 for main curing is also disposed at the downstream thereof, and this irradiation unit 44 for main curing irradiates the recording medium S with ultraviolet radiation. This recording apparatus may be configured as shown in FIG. 11 of JP-A-2010-269471. Meanwhile, when ultraviolet radiation is irradiated two or more times, ultraviolet radiation may not be irradiated from all of the irradiation units 42a, 42b, 42c and 42d for temporary curing.

In the ultraviolet irradiation process, it is preferred that the energy of the first irradiation be lower than the energy of the second irradiation or subsequent. Specifically, the first irradiation energy is preferably 2 mJ/cm$^2$ to 50 mJ/cm$^2$, more preferably 2.5 mJ/cm$^2$ to 40 mJ/cm$^2$, still more preferably 2.5 mJ/cm$^2$ to 35 mJ/cm$^2$, and particularly preferably 5 mJ/cm$^2$ to 30 mJ/cm$^2$. When the first irradiation energy is within the above range, cleaning resettability and surface curability become better, and bleeding is further suppressed.

The first irradiation intensity is preferably 5 mW/cm$^2$ to 100 mW/cm$^2$, more preferably 10 mW/cm$^2$ to 80 mW/cm$^2$, and still more preferably 5 mW/cm$^2$ to 50 mW/cm$^2$. When the first irradiation intensity is within the above range, cleaning resettability and surface curability become more excellent, and bleeding is more suppressed. The first irradiation is preferably initiated within 1 second, and more preferably initiated within 0.5 seconds after ink adheres to the recording medium.

The total ultraviolet irradiation energy is preferably 50 mJ/cm$^2$ to 1500 mJ/cm$^2$, and more preferably 100 mJ/cm$^2$ to 1400 mJ/cm$^2$ or 100 mJ/cm$^2$ to 1500 mJ/cm$^2$. When the total ultraviolet irradiation energy is within the above range, tackiness is suppressed, and internal curability can be further improved.

The intensity of the second irradiation or subsequent is preferably 5 mW/cm$^2$ to 2000 mW/cm$^2$, more preferably 10 mW/cm$^2$ to 1500 mW/cm$^2$, and still more preferably 20 mW/cm$^2$ to 1500 mW/cm$^2$. When the intensity of the second irradiation or subsequent is within the above range, tackiness is suppressed, and internal curability can be further improved.

The irradiation intensity of a light source having the highest irradiation energy in the second ultraviolet irradiation or subsequent is preferably 350 mW/cm$^2$ to 2000 mW/cm², more preferably 500 mW/cm² to 2000 mW/cm², and still more preferably 700 mW/cm² to 1500 mW/cm². When the irradiation intensity of the light source having the highest irradiation energy in the second ultraviolet irradiation or subsequent is within the above range, tackiness is suppressed, and internal curability can be further improved. The irradiation intensity and irradiation energy can be obtained using the methods described in Examples.

The total irradiation energy in the second ultraviolet irradiation or subsequent with respect to the irradiation energy in the first ultraviolet irradiation is preferably 8 times to 140 times. Here, the lower limit is more preferably equal to or more than 10 times, still more preferably equal to or more than 15 times, and particularly preferably equal to or more than 18 times. The upper limit is more preferably equal to or less than 120 times, and still more preferably equal to or less than 100 times.

Examples of the light source used in the first ultraviolet irradiation include, but are not limited to, a semiconductor light like light-emitting diodes (LED) such as an ultraviolet light emitting diode (UV-LED) or an ultraviolet laser diode (UV-LD), a metal halide light source, and a mercury lamp. Among these light sources, a semiconductor light source having a peak wavelength in a wavelength range of 350 nm to 420 nm is preferable, and an LED having a peak wavelength in a wavelength range of 350 nm to 420 nm is more preferable. When a semiconductor light source is used, the scale of an ink jet recording apparatus can be reduced, the lifespan thereof can be increased, the efficiency of an ink jet recording method can be improved, and low costs can be accomplished, compared to when a metal halide light source or a mercury lamp is used.

Examples of the light source used in the second ultraviolet irradiation or subsequent, may include, but are not limited to, the above-mentioned light sources.

Cleaning Process

The cleaning process is a process of wiping an ink jet head nozzle having discharged an ink composition using a nozzle wiping member. When an ink composition containing a polymerizable compound having a di- or higher functional (meth)acryloyl group is used, a crosslinked polymer derived from the polymerizable compound having a di- or higher functional (meth)acryloyl group is easily formed around the nozzle. The crosslinked polymer cannot be easily removed by only cleaning according to flushing, suction, or ink pressure discharging. However, when the nozzle is directly wiped using the nozzle wiping member, excellent cleaning resettability can be exhibited, and discharge stability can be secured.

Nozzle Wiping Member

The nozzle wiping member is not particularly limited as long as it can wipe off the hardened material derived from the ink composition and adhered to a nozzle outlet and a nozzle formation surface. The nozzle wiping member may be operated by a cleaning mechanism. The cleaning mechanism is not particularly limited, but, for example, is provided with a driving mechanism having a pressing member relatively pressing the nozzle wiping member and the nozzle formation surface. This driving mechanism may conduct a cleaning action for removing the ink composition adhered to the nozzle formation surface using the nozzle wiping member by relatively moving at least one of the nozzle wiping member and the head to the other one. As the nozzle wiping member, for example, a cloth-shaped nozzle wiping member, the surface thereof being brought into contact with the nozzle formation surface, or a blade-shaped nozzle wiping member wiping the nozzle formation surface using the end of a blade may be used. It is preferred that the nozzle wiping member be able to wipe the entire nozzle formation surface by the relative movement of the nozzle wiping member and the head one time.

The cleaning process may be conducted after continuous printing, and may also be conducted while stopping printing during continuous printing. When the cleaning process is conducted after continuous printing, the cleaning process may be conducted immediately after continuous printing, may be conducted before the next continuous printing starts, and may also be conducted before the next continuous printing has started.

As the raw material of the nozzle wiping member, for example, an elastic material or a liquid-absorptive material may be used without limitation. Specific examples thereof include rubber, an elastomer, fabric, sponge, and pulp. Among them, rubber and fabric are preferable. A nozzle wiping member made of these raw materials can easily bend, and particularly when a nozzle plate cover is provided, the member can easily wipe off the ink adhered to the nozzle surface and has a strong wiping. Further, examples of the fabric may include, but are not limited to, cupra, polyester, polyethylene, polypropylene, lyocell, and rayon. In this case, particularly, when the raw material of the nozzle wiping member is a nonwoven fabric (polyester) or cupra, fluff occurs slightly, so it is difficult to suck ink from the nozzle, and it is also difficult to occur dot omission. For this reason, these raw materials are preferable. Examples of elastomers include fluorine rubber, silicone rubber, nitrile rubber, ethylene-propylene rubber, urethane rubber, chloroprene rubber, and butyl rubber. Among them, fluorine rubber and silicon rubber are preferable in terms of durability.

Cleaning Liquid

In the cleaning process, it is preferred that a cleaning liquid containing an alkylene glycol derivative be applied to a nozzle or nozzle plate of an ink jet head discharging an ink composition to perform wiping using a nozzle wiping member. When the cleaning liquid is used, the polymerization product of the ink composition applied to the nozzle plate can be dissolved, and thus poor discharge of the ink composition through the nozzle can be easily overcome. Further, pigment particles are easily transferred from the surface of the nozzle wiping member to the inside thereof, and thus pigment particles do not easily remain on the surface of the nozzle wiping member.

As the method of applying a cleaning liquid to a nozzle or a nozzle plate, which is not particularly limited, for example, there is a method of wiping a nozzle by applying a cleaning liquid to a nozzle wiping member or a method of applying a cleaning liquid to a nozzle or a nozzle plate and rubbing the nozzle or the nozzle plate using the nozzle wiping member.

It is preferred that the cleaning liquid contain an organic solvent generally used as a cleaning liquid for an ink composition or ink. Therefore, foreign matter produced on a nozzle or a nozzle formation surface is dissolved or swelled to be easily removed by wiping, and ink components such as pigment particles are easily absorbed in a nozzle wiping member. The cleaning liquid is not particularly limited as long as it can exhibit the above functions.

Examples of the organic solvent include, but are not limited to, an alkylene glycol derivative, an alcohol-based solvent, an alkylene glycol-based solvent, a hydrocarbon-based solvent, and an ester-based solvent. Among these organic solvents, an alkylene glycol derivative, an alkylene glycol-based solvent, and an alcohol-based solvent are preferable, and an alkylene glycol derivative is more preferable.

Examples of the alkylene glycol derivative include, but are not limited to, an alkyl ether of an alkylene glycol, an ester of an alkylene glycol, and an ether ester of an alkylene glycol. As the alkylene glycol, although not particularly limited, for example, a single alkylene glycol or an alkylene glycol polymerized with a hydroxide group in a repetition unit number of 2 to 4 single alkylene glycolsis preferable. As the single alkylene glycol, an alkylene glycol of 2 to 4 carbon atoms, such as ethylene glycol, propylene glycol, and butylene glycol are preferable. In the case of the above polymerized alkylene glycol, different kinds of alkylene glycols may also be used. As the alkyl ether of an alkylene glycol, although not particularly limited, for example, an alkyl ether of 1 to 4 carbon atoms of an alkylene glycol is preferable. The number of alkyl ether of an alkylene glycol may be 1 or 2. The esters of an alkylene glycol are not particularly limited, but, for example, an alkylene glycol acetate, an alkylene glycol propionate, and an alkylene glycol butyrate, which are esters of 2 to 5 carbon atoms bonded to an alkylene glycol, are preferable, and an alkylene glycol acetate is more preferable. The number of esters of an alkylene glycol is preferably 1 to 2. The ester ether of an alkylene glycol may have both the alkyl ether and the ester of the above alkylene glycols. Examples of the alkylene glycol-based solvent include the alkylene glycols described in the explanation of the above-mentioned alkylene glycol derivatives. Among the alkylene glycol derivatives, an ether ester of an alkylene glycol and an alkyl ether of an alkylene glycol are more preferable in terms of cleaning performance. Examples of the alkylene glycol derivatives may include, but are not limited to, triethylene glycol monobutyl ether, ethyldiglycol acetate, butyldiglycol acetate, dipropylene glycol diethyl ether, and ethylene glycol diacetate. Examples of the alcohol-based solvent preferably include alkyl alcohols of 1 to 6 carbon atoms.

The content of the organic solvent is preferably equal to or more than 20 mass %, more preferably equal to or more than 50 mass %, and still more preferably equal to or more than 70 mass %, based on 100 mass % of the cleaning liquid. The upper limit thereof is not limited.

Figure 3:
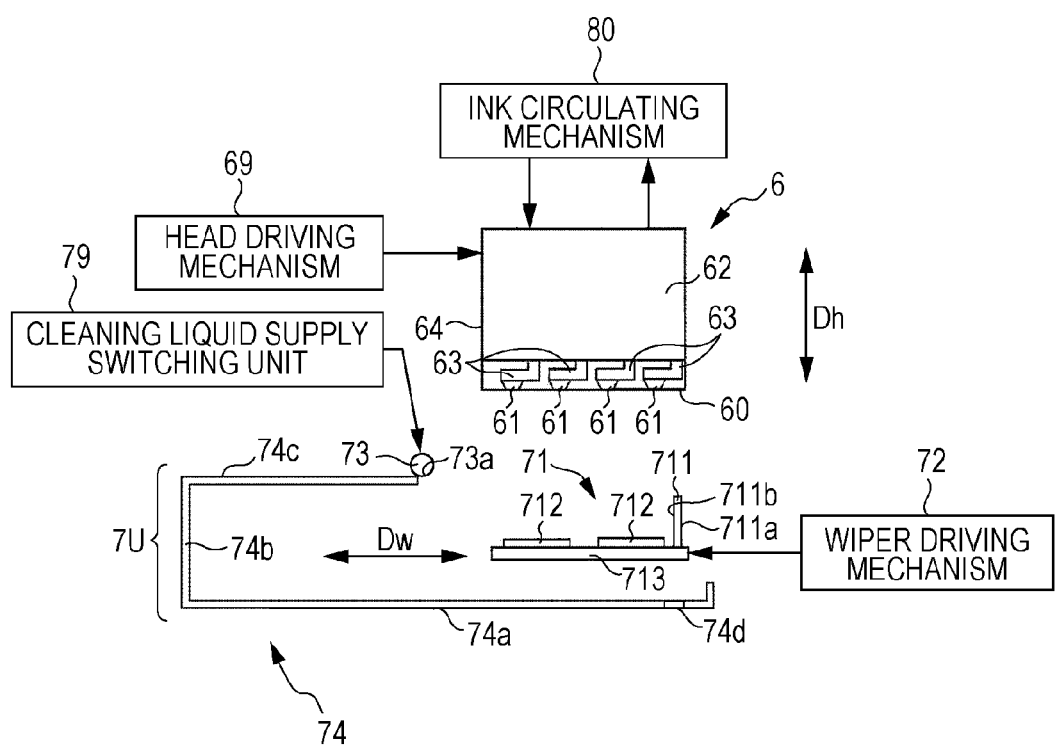
FIG. 3 is a schematic view showing an example of the mechanism for performing a cleaning process in the ink jet recording method according to the present embodiment.

FIG. 3 is a schematic view showing an example of the mechanism for performing a cleaning process. The cleaning process for cleaning one head will be described, but the cleaning process for cleaning a plurality of heads is applied in the same manner. Further, for convenience of explanation, as shown in FIG. 3, an approximately horizontal nozzle formation surface 60 is described, but a nozzle formation surface is not limited thereto.

A maintenance unit 7U used in a cleaning process is disposed in one-to-one correspondence with respect to each head, and perform maintenance (cleaning) such as wiping or capping with respect to each head. This maintenance unit 7U is provided in the vicinity of a platen (drum 26 in the recording apparatus) in a depth direction of the head of FIG. 2. Meanwhile, a head 64 is freely moved by a head driving mechanism 69 between the printing position above the platen and the maintenance position above the maintenance unit 7U in the depth direction of the drawing. Further, the head 64 is freely moved by the head driving mechanism 69 in a vertical direction Dh perpendicular to a nozzle formation surface 60 such that the cleaning position adjacent to the maintenance unit 7U or the retracted position spaced apart from the maintenance unit 7U can be obtained in the maintenance position. Further, at the time of maintenance, the head 64 is appropriately moved in the vertical direction Dh in accordance with the process of maintenance.

The head 64 includes nozzles 61 opening on a nozzle formation surface 60, a reservoir 62 temporarily storing ink, and cavities 63 through which the nozzles 61 and the reservoir 62 communicate, and supplies ink from the reservoir 62 to the nozzles 61 via cavities 63. Further, pressure is applied to the ink charged into the cavities 63 according to an operation command from the controller 120 (FIG. 1), thereby discharging the ink through the nozzles 61. In FIG. 3, for convenience of explanation, four nozzles 61 are arranged laterally, but the number of the nozzles 61 is not limited thereto, and the arrangement thereof is not limited thereto. In FIG. 3, an ink circulating mechanism 80 is provided in combination with the head 64, and the speed or pressure of the ink circulated between a tank (not shown) for storing ink and the reservoir 62 of the head 64 is controlled by the ink circulating mechanism 80.

The maintenance unit 7U includes: a moving body 71 having a wiper 711, caps 712, and a support 713 for integrally movably supporting the wiper 711 and the caps 712; a wiper driving mechanism 72 for moving the moving body 71 in a wiping direction Dw along the nozzle formation surface 60; a cleaning liquid supply pipe 73 for discharging a cleaning liquid through an injection nozzle 73a; and a housing 74. Each of these members has a Y-direction length equal to or greater than that of the head 64, and maintenance can be performed over the entire area of the nozzle formation surface 60. Further, the wiper 711 is moved in the wiping direction Dw with wiping surfaces 711a and 711b making contact with the nozzle formation surface 60, thereby performing wiping. Further, the caps 712 adhere tightly to the nozzle formation surface 60 to cover all of the nozzles 61, thereby performing capping.

The cleaning liquid supply pipe 73 is provided in the Y direction with a plurality of injection nozzle 73a opening toward the head 64, and is configured such that the cleaning liquid can be ejected to the nozzle formation surface of the head and the wiper. Here, as the cleaning liquid used in wiping, a cleaning liquid suitable for cleaning action may be appropriately used, but, as in the present embodiment, when an UV ink is used, preferably, the cleaning liquid contains an organic solvent capable of dissolving the cured UV ink. The cleaning liquid may also contain a polymerization inhibitor or a surfactant. The switching of supply of the cleaning liquid by the cleaning liquid supply pipe 73 is conducted by a cleaning liquid supply switching unit 79.

The housing 74 is essentially composed of a bottom 74a approximately parallel to the wiping direction Dw, a sidewall 74b connected to one end of the bottom 74a in the wiping direction Dw of the bottom 74a, and a canopy 74c extending from the upper end of the sidewall 74b onto the same side as the bottom 74a along the wiping direction Dw. The bottom 74a is provided over a wider area than an area within which the moving body 71 can be moved in the wiping direction Dw, and accepts waste liquid containing the ink or cleaning liquid produced during maintenance. The waste liquid accepted by the bottom 74a is discharged from the maintenance unit 7U through an outlet 74d formed in the bottom 74a. The size of the canopy 74c in the wiping direction Dw is larger than that of the moving body 71. Further, during printing, the moving body 71 is maintained in a state in which it is covered by the canopy 74c at the standby position under the canopy 74c. In doing so, the canopy 74c blocks the light (ultraviolet light) radiated from an UV lamp, thus preventing the UV ink adhered to the wiper 71 or the caps 712 from being cured.

Ink Jet Recording Apparatus

The ink jet recording apparatus used in the present embodiment is used in carrying out the above-mentioned ink jet recording method, and may have the above-mentioned constitution.

EXAMPLES

Hereinafter, the invention will be described in more detail with reference to the following Examples and Comparative Examples. However, the invention is not limited to the following Examples.

Raw Materials for Ink Composition

The main raw materials for the ink compositions used in the following Examples and Comparative Examples were as follows.

Color Material

C. I. pigment black 7

Dispersant

Solspers 36000 (trade name, manufactured by LUBRIZOL Corporation, hereinafter, abbreviated as "Sol 36000")

Polymerizable Compounds

VEEA (2-(2-vinyloxyethoxyl)ethyl acrylate, manufactured by Nippon Shokubai Ltd.)

PEA (phenoxyethyl acrylate, manufactured by Osaka Organic Chemical Industry Co., Ltd.)

DPGDA (dipropylene glycol diacrylate, manufactured by Sartomer Co.)

TPGDA (tripropylene glycol diacrylate, manufactured by Osaka Organic Chemical Industry Ltd.)

V#335HP (tetraethylene glycol diacrylate, manufactured by Osaka Organic Chemical Industry Ltd.)

A-TMPT (trimethylolpropane triacrylate, trade name, manufactured by Shin Nakamura Chemical Co., Ltd.)

Hindered Amine Compounds (polymerization inhibitors)

TINUVIN 144 (bis(1,2,2,6,6-pentamethyl-4-piperidyl)[3,5-bis(1,1-dimethylethyl)-4-hydroxyphenyl]methyl]butyl malonate, trade name, manufactured by BASF Corporation)

LA-82 (1,2,2,6,6-pentamethyl-4-piperidyl methacrylate, trade name, manufactured by ADEKA Corporation)

LA-7RD (2,2,6,6-tetramethyl-4-hydroxypiperidine-1-oxyl, trade name, manufactured by ADEKA Corporation)

Other Polymerization Inhibitor

MEHQ (p-methoxyphenol)

Photopolymerization Initiators

Irgacure 819 (trade name of BASF Corporation, solid content 100 mass %)

Irgacure TPO (trade name of BASF Corporation, solid content 100 mass %)

Irgacure 369 (trade name of BASF Corporation, solid content 100 mass %)

Preparation of Ink Composition

Each of the raw materials were mixed together in composition ratios (part by mass) shown in the following Tables 1 and 2, and the mixture was sufficiently stirred to obtain an ink composition in the air. Moreover, the part by mass of PEA shown in each of the composition ratios in the tables is shown approximately. The ink composition was prepared by the part by mass of PEA being suitably increased or decreased such that the total of raw materials in each composition became 100 parts by mass.

Ink Jet Recording Method

Examples 1 to 47 and Comparative Examples 1 to 9

SurePress L-4033A (trade name, manufactured by Seiko Epson Corporation) was modified and then used as described below. As shown in FIG. 2, four line heads (each head having a length corresponding approximately to a width (recorded width) of a recording medium within which an image is recorded) were arranged in parallel in the transporting direction of the recording medium, and light sources disposed downstream in a transporting direction of each of the heads. Further, when recording was performed by a line printer, among the heads and light sources shown in FIG. 2, the head K, the irradiation unit 42a for temporary curing, and the irradiation unit 44 for main curing were used, and other heads and light sources were not used. Further, the transporting drum 26 was made of aluminum, the diameter of the transporting drum 26 was set to 500 mm, the printing speed was set to 285 mm/s, and the drum rotation period was set to 5.5 seconds. Each of the heads had a nozzle density of 600 dpi in a nozzle row in the width direction of the recording medium.

Each of the ink compositions shown in Tables 1 to 3 was discharged from the head K toward a PET film (Lumirror S10 (thickness: 100 μm) manufactured by Toray Industries, Inc.) under the conditions of a recording resolution of 600 dpi×600 dpi and one pass (single pass). In this case, the amount of ink droplets per pixel was adjusted such that the thickness of the film after curing is 10 μm. In this way, a solid-pattern image was formed. Here, the "solid-pattern image" means an image in which the material of the recording medium is entirely covered with ink in a dot-recorded pattern with all of the pixels each being a minimum recording unit area defined by a recording resolution.

Subsequently, under the conditions shown in Tables 1 to 3, ultraviolet radiation was radiated to the ink adhered to the PET film from a light source, thus curing the ink composition. Specifically, first, an LED having a peak wavelength of 395 nm and an irradiation peak intensity of 50 mW/cm$^2$ was used as the light source 42a. Ultraviolet rays were radiated from this LED at irradiation energy (mJ/cm$^2$) according to each row of the tables, thus performing temporary curing. Further, an LED having a peak wavelength of 395 nm and an irradiation peak intensity of 1500 mW/cm$^2$ was used as the light source 44. Ultraviolet rays were radiated from this LED for a predetermined time at an irradiation energy (mJ/cm$^2$) according to each row of the tables, thus curing (main curing) a solid-pattern image. In this way, a film with a cured solid-pattern image was obtained. Moreover, it was ascertained by a finger touch test that the tackiness of the surface of the cured film had disappeared. Further, the temporary curing corresponds to the first irradiation, the main curing corresponds to the second or subsequent irradiation because irradiation was performed twice in the present Examples, and the irradiation energy in the main curing corresponds to the total irradiation energy in the second or subsequent irradiation. Illuminance (irradiation intensity) was measured using an ultraviolet ray intensity meter UM-10 and a light-receiving device UM-400 (manufactured by Konica Minolta Inc.), and irradiation energy was obtained by illuminance×irradiation duration (s).

After continuous printing for 60 minutes, 10 cc of ink was discharged from the nozzles by pressurization, and then a cleaning process of reciprocally wiping a nozzle plate 30 times using a fluorine rubber wiper in a direction perpendicular to the row of the nozzles was carried out. The wiper was formed of a blade-shaped wiping member with fluorine rubber, and was configured such that the thickness of the wiper was 0.8 mm, the height thereof was set to 1.5 cm, the length thereof was set to the length of the nozzle formation surface in the direction of a nozzle row and the entire nozzle formation surface was wiped by wiping one time.

The cleaning process is described in detail as follows.
Cleaning process 1: wiping was conducted without using a cleaning liquid.
Cleaning process 2: cleaning process 2 was carried out in the same manner as cleaning process 1, except that 10 cc of EDGAC (100%), as a cleaning liquid, was applied to a nozzle plate by spraying, and then wiping was performed. EDGAC: ethyl diglycol acetate.
Cleaning process 3: only ink discharging was carried out without performing wiping.
Cleaning process 4: cleaning process 4 was carried out in the same manner as cleaning process 2, except that 2-propanol (100%) was used as a cleaning liquid.

Wrinkles

Curing wrinkles were evaluated according to the following criteria, based on the results of observation of the cured film obtained in the above manner and the results of measurement of glossiness of a coated film at 60° based on JIS Z 8741. By the comparison of glossinesses, the degree of generation of curing wrinkles, which cannot be visually confirmed, can be indirectly confirmed, which means that the generation of curing wrinkles becomes higher as glossiness becomes lower.
A: Generation of curing wrinkles was not recognized even with loupe observation. Further, glossiness was equal to or more than 90%, compared to Example 1.
B: Generation of curing wrinkles was not recognized even with visual observation, but was recognized with loupe observation. Further, glossiness was equal to or more than 80% and less than 90%, compared to Example 1.
C: Generation of curing wrinkles was recognized even with visual observation. Further, glossiness was equal to or more than 20% and less than 80%, compared to Example 1.
D: Generation of curing wrinkles was recognized even with visual observation. Further, glossiness was 20% or less, compared to Example 1.

Storage Stability

Each ink composition was placed in a sample bottle, left at 60° C. for 7 days, and then viscosity (25° C.) before and after being left was measured using a digital viscometer VM-100 manufactured by Yamaichi Electronics Co., Ltd. Storage stability was evaluated by determining the amount of change in viscosity after being left with respect to the viscosity before being left. Evaluation criteria were as follows.
A: Viscosity change was less than 5%.
B: Viscosity change was 5% or more to less than 10%.
C: Viscosity change was 10% or more to less than 15%.
D: Viscosity change was 15% or more.

Bleeding

Patterns of alphabetical characters of A to Z, obtained by performing recording in the same manner as above, were recorded instead of the solid-pattern. In the alphabetical character patterns, letters having a size of 2 points to 5 points were recorded. Bleeding was evaluated based on the letter point size that could be visually recognized.
A: All the letters of 2 points were visually recognized.
B: All the letters of 3 points were visually recognized.
C: All the letters of 4 points were visually recognized.
D: All the letters of 5 points were visually recognized.

Streaks

Based on the results of observation of the cured film obtained as above, streaks were evaluated according to the following criteria.
A: Streaks (stripes extending in the transporting direction of a recording medium, state in which a base was seen because the recording medium was not sufficiently coated with ink) were not found even with loupe observation.
B: Generation of streaks was not recognized with visual observation, but was recognized even with loupe observation.
C: Slight generation of streaks was recognized with visual observation.
D: Clear generation of streaks was recognized by visual observation.

Tackiness

The surface of a cured film was rubbed using a Johnson cotton swab (manufactured by Johnson & Johnson Co., Ltd.) under the conditions in which the number of times of rubbing was 5 times back and forth and a rubbing force was a load of 3 g. After the rubbing, the surface of the cured film was visually observed. Evaluation criteria were as follows. The results thereof are given in Table 2.
A: Traces of cotton swab did not remain on the cured film, and the cotton swab did not become colored.
B: Traces of cotton swab somewhat remained on the cured film, but the cotton swab did not become colored.
C: Traces of cotton swab somewhat remained on the cured film, the cotton swab became colored, and cured material adhered to the cotton swab solidified.
D: Traces of cotton swab somewhat remained on the cured film, the cotton swab became colored, and cured material adhered to the cotton swab did not solidify.

Cleaning Resettability Test

After continuous printing for 60 minutes, any one of cleaning processes 1 to 4 with respect to each row in the tables was performed. After the cleaning process, the discharge of nozzles was examined, and then the generation of non-discharging nozzles and flight-curved nozzles was checked for. This continuous printing, cleaning process, and nozzle discharge examination was repeatedly performed. Based on the cumulative total time of continuous printing before at least one of 360 examined nozzles became a non-discharging nozzle or a flight-curved nozzle, cleaning resettability was evaluated according to the following criteria.
A: A total time of continuous printing was 9 hours or more when poor discharge occurred.
B: A total time of continuous printing was 7 hours or more to less than 9 hours when poor discharge occurred.
C: A total time of continuous printing was 1 hour or more to less than 6 hours when poor discharge occurred.
D: A total time of continuous printing was less than 1 hour when poor discharge occurred.

TABLE 1

|  |  | Examples | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Pigment | C. I. pigment black 7 | 2.0 | 2.0 | 2.0 | 2.0 | 2.0 | 2.0 | 2.0 | 2.0 | 2.0 | 2.0 |

TABLE 1-continued

|  |  | Examples | | | | | | | | | |
|---|---|---|---|---|---|---|---|---|---|---|---|
| Dispersant | Solspers 36000 | 1.0 | 1.0 | 1.0 | 1.0 | 1.0 | 1.0 | 1.0 | 1.0 | 1.0 | 1.0 |
| Polymerizable | VEEA | 20.0 | 20.0 | 20.0 | 20.0 | 20.0 | 20.0 | 20.0 | 20.0 | 20.0 | 20.0 |
| compound | PEA | 29.8 | 29.9 | 29.9 | 29.9 | 29.9 | 29.3 | 29.8 | 29.8 | 49.8 | 44.8 |
|  | DPGDA | 35.0 | 35.0 | 35.0 | 35.0 | 35.0 | 35.0 | 35.0 | 35.0 | 15.0 | 20.0 |
|  | TPGDA |  |  |  |  |  |  |  |  |  |  |
|  | V#335HP |  |  |  |  |  |  |  |  |  |  |
|  | A-TMPT |  |  |  |  |  |  |  |  |  |  |
| Hindered amine | TINUVIN 144 |  |  |  |  |  |  |  | 0.1 |  |  |
| compound | LA82 |  |  |  |  |  |  | 0.1 |  |  |  |
|  | LA-7RD | 0.1 | 0.004 | 0.005 | 0.025 | 0.050 | 0.600 |  |  | 0.1 | 0.1 |
| Other polymerization inhibitor | MEHQ | 0.1 | 0.1 | 0.1 | 0.1 | 0.1 | 0.1 | 0.1 | 0.1 | 0.1 | 0.1 |
| Polymerization | Irgacure 819 | 5.0 | 5.0 | 5.0 | 5.0 | 5.0 | 5.0 | 5.0 | 5.0 | 5.0 | 5.0 |
| initiator | Irgacure TPO | 5.0 | 5.0 | 5.0 | 5.0 | 5.0 | 5.0 | 5.0 | 5.0 | 5.0 | 5.0 |
|  | Irgacure 369 | 2.0 | 2.0 | 2.0 | 2.0 | 2.0 | 2.0 | 2.0 | 2.0 | 2.0 | 2.0 |
| Total |  | 100 | 100 | 100 | 100 | 100 | 100 | 100 | 100 | 100 | 100 |
| Energy for temporary curing |  | 10.0 | 10.0 | 10.0 | 10.0 | 10.0 | 10.0 | 10.0 | 10.0 | 10.0 | 10.0 |
| Energy for main curing |  | 350 | 350 | 350 | 350 | 350 | 350 | 350 | 350 | 350 | 350 |
| Energy for main curing/ Energy for temporary curing |  | 35.0 | 35.0 | 35.0 | 35.0 | 35.0 | 35.0 | 35.0 | 35.0 | 35.0 | 35.0 |
| Cleaning process |  | 1 | 1 | 1 | 1 | 1 | 1 | 1 | 1 | 1 | 1 |
| Wrinkles |  | A | A | A | A | A | B | A | A | B | A |
| Storage stability |  | A | C | B | A | A | A | B | B | A | A |
| Bleeding |  | A | A | A | A | A | A | A | A | A | A |
| Streaks |  | A | A | A | A | A | A | A | A | A | A |
| Tackiness |  | A | A | A | A | A | A | A | A | A | A |
| Cleaning resettability |  | A | A | A | A | A | A | A | A | A | A |

|  |  | 11 | 12 | 13 | 14 | 15 | 16 | 17 | 18 | 19 | 20 |
|---|---|---|---|---|---|---|---|---|---|---|---|
| Pigment | C. I. pigment black 7 | 2.0 | 2.0 | 2.0 | 2.0 | 2.0 | 2.0 | 2.0 | 2.0 | 2.0 | 2.0 |
| Dispersant | Solspers 36000 | 1.0 | 1.0 | 1.0 | 1.0 | 1.0 | 1.0 | 1.0 | 1.0 | 1.0 | 1.0 |
| Polymerizable | VEEA | 20.0 | 20.0 | 20.0 | 20.0 | 20.0 | 20.0 | 20.0 | 20.0 | 20.0 | 20.0 |
| compound | PEA | 24.8 | 19.8 | 29.8 | 29.8 | 29.8 | 29.8 | 29.8 | 29.8 | 29.8 | 29.8 |
|  | DPGDA | 40.0 | 45.0 |  |  | 35.0 | 35.0 | 35.0 | 35.0 | 35.0 | 35.0 |
|  | TPGDA |  |  | 35.0 |  |  |  |  |  |  |  |
|  | V#335HP |  |  |  | 35.0 |  |  |  |  |  |  |
|  | A-TMPT |  |  |  |  |  |  |  |  |  |  |
| Hindered amine | TINUVIN 144 |  |  |  |  |  |  |  |  |  |  |
| compound | LA82 |  |  |  |  |  |  |  |  |  |  |
|  | LA-7RD | 0.1 | 0.1 | 0.1 | 0.1 | 0.1 | 0.1 | 0.1 | 0.1 | 0.1 | 0.1 |
| Other polymerization inhibitor | MEHQ | 0.1 | 0.1 | 0.1 | 0.1 | 0.1 | 0.1 | 0.1 | 0.1 | 0.1 | 0.1 |
| Polymerization | Irgacure 819 | 5.0 | 5.0 | 5.0 | 5.0 | 5.0 | 5.0 | 5.0 | 5.0 | 5.0 | 5.0 |
| initiator | Irgacure TPO | 5.0 | 5.0 | 5.0 | 5.0 | 5.0 | 5.0 | 5.0 | 5.0 | 5.0 | 5.0 |
|  | Irgacure 369 | 2.0 | 2.0 | 2.0 | 2.0 | 2.0 | 2.0 | 2.0 | 2.0 | 2.0 | 2.0 |
| Total |  | 100 | 100 | 100 | 100 | 100 | 100 | 100 | 100 | 100 | 100 |
| Energy for temporary curing |  | 10.0 | 10.0 | 10.0 | 10.0 | 40.0 | 30.0 | 20.0 | 5.0 | 2.9 | 2.5 |
| Energy for main curing |  | 350 | 350 | 350 | 350 | 350 | 350 | 350 | 350 | 350 | 350 |
| Energy for main curing/ Energy for temporary curing |  | 35.0 | 35.0 | 35.0 | 35.0 | 8.8 | 11.7 | 17.5 | 70.0 | 119.9 | 140.0 |
| Cleaning process |  | 1 | 1 | 1 | 1 | 1 | 1 | 1 | 1 | 1 | 1 |
| Wrinkles |  | A | A | A | A | A | A | A | A | A | A |
| Storage stability |  | A | A | A | A | A | A | A | A | A | A |
| Bleeding |  | A | A | A | A | A | A | A | A | A | B |
| Streaks |  | A | A | A | A | B | B | A | A | A | A |
| Tackiness |  | A | A | A | A | A | A | A | A | A | A |
| Cleaning resettability |  | A | B | A | A | C | B | A | A | A | A |

TABLE 2

|  |  | Examples | | | | | | | | | |
|---|---|---|---|---|---|---|---|---|---|---|---|
|  |  | 21 | 22 | 23 | 24 | 25 | 26 | 27 | 28 | 29 | 30 |
| Pigment | C. I. pigment black 7 | 2.0 | 2.0 | 2.0 | 2.0 | 2.0 | 2.0 | 2.0 | 2.0 | 2.0 | 2.0 |
| Dispersant | Solspers 36000 | 1.0 | 1.0 | 1.0 | 1.0 | 1.0 | 1.0 | 1.0 | 1.0 | 1.0 | 1.0 |
| Polymerizable | VEEA | 20.0 | 20.0 | 20.0 | 20.0 | 20.0 | 20.0 | 20.0 | 20.0 | 20.0 | 20.0 |

TABLE 2-continued

|  |  | Examples | | | | | | | | | |
|---|---|---|---|---|---|---|---|---|---|---|---|
| compound | PEA | 29.8 | 29.8 | 29.8 | 29.8 | 29.8 | 29.8 | 29.8 | 59.8 | 54.4 | 54.3 |
|  | DPGDA | 35.0 | 35.0 | 35.0 | 35.0 | 35.0 | 35.0 | 30.0 | 5.0 | 10.0 | 10.0 |
|  | TPGDA | | | | | | | | | | |
|  | V#335HP | | | | | | | | | | |
|  | A-TMPT | | | | | | | 5.0 | | | |
| Hindered amine | TINUVIN 144 | | | | | | | | | | |
| compound | LA82 | | | | | | | | | | |
|  | LA-7RD | 0.1 | 0.1 | 0.1 | 0.1 | 0.1 | 0.1 | 0.1 | 0.1 | 0.5 | 0.6 |
| Other polymerization inhibitor | MEHQ | 0.1 | 0.1 | 0.1 | 0.1 | 0.1 | 0.1 | 0.1 | 0.1 | 0.1 | 0.1 |
| Polymerization initiator | Irgacure 819 | 5.0 | 5.0 | 5.0 | 5.0 | 5.0 | 5.0 | 5.0 | 5.0 | 5.0 | 5.0 |
|  | Irgacure TPO | 5.0 | 5.0 | 5.0 | 5.0 | 5.0 | 5.0 | 5.0 | 5.0 | 5.0 | 5.0 |
|  | Irgacure 369 | 2.0 | 2.0 | 2.0 | 2.0 | 2.0 | 2.0 | 2.0 | 2.0 | 2.0 | 2.0 |
| Total | | 100 | 100 | 100 | 100 | 100 | 100 | 100 | 100 | 100 | 100 |
| Energy for temporary curing | | 10.0 | 10.0 | 10.0 | 10.0 | 10.0 | 10.0 | 10.0 | 10.0 | 10.0 | 40.0 |
| Energy for main curing | | 90 | 120 | 180 | 700 | 1200 | 1400 | 350 | 350 | 350 | 350 |
| Energy for main curing/ Energy for temporary curing | | 9.0 | 12.0 | 18.0 | 70.0 | 120.0 | 140.0 | 35.0 | 35.0 | 35.0 | 8.8 |
| Cleaning process | | 1 | 1 | 1 | 1 | 1 | 1 | 1 | 1 | 1 | 1 |
| Wrinkles | | A | A | A | A | A | A | A | C | C | B |
| Storage stability | | A | A | A | A | A | A | A | A | A | A |
| Bleeding | | B | A | A | A | A | A | A | A | A | A |
| Streaks | | A | A | A | A | A | A | A | A | A | B |
| Tackiness | | B | A | A | A | A | A | A | A | A | A |
| Cleaning resettability | | A | A | A | A | A | A | C | A | A | B |

|  |  | 31 | 32 | 33 | 34 | 35 | 36 | 37 | 38 | 39 | 40 |
|---|---|---|---|---|---|---|---|---|---|---|---|
| Pigment | C. I. pigment black 7 | 2.0 | 2.0 | 2.0 | 2.0 | 2.0 | 2.0 | 2.0 | 2.0 | 2.0 | 2.0 |
| Dispersant | Solspers 36000 | 1.0 | 1.0 | 1.0 | 1.0 | 1.0 | 1.0 | 1.0 | 1.0 | 1.0 | 1.0 |
| Polymerizable compound | VEEA | 20.0 | 20.0 | 20.0 | 20.0 | 20.0 | 20.0 | 20.0 | 20.0 | 20.0 | 20.0 |
|  | PEA | 54.3 | 54.3 | 54.3 | 54.3 | 54.3 | 54.3 | 54.3 | 54.3 | 54.3 | 54.3 |
|  | DPGDA | 10.0 | 10.0 | 10.0 | 10.0 | 10.0 | 10.0 | 10.0 | 10.0 | 10.0 | 10.0 |
|  | TPGDA | | | | | | | | | | |
|  | V#335HP | | | | | | | | | | |
|  | A-TMPT | | | | | | | | | | |
| Hindered amine compound | TINUVIN 144 | | | | | | | | | | |
|  | LA82 | | | | | | | | | | |
|  | LA-7RD | 0.6 | 0.6 | 0.6 | 0.6 | 0.6 | 0.6 | 0.6 | 0.6 | 0.6 | 0.6 |
| Other polymerization inhibitor | MEHQ | 0.1 | 0.1 | 0.1 | 0.1 | 0.1 | 0.1 | 0.1 | 0.1 | 0.1 | 0.1 |
| Polymerization initiator | Irgacure 819 | 5.0 | 5.0 | 5.0 | 5.0 | 5.0 | 5.0 | 5.0 | 5.0 | 5.0 | 5.0 |
|  | Irgacure TPO | 5.0 | 5.0 | 5.0 | 5.0 | 5.0 | 5.0 | 5.0 | 5.0 | 5.0 | 5.0 |
|  | Irgacure 369 | 2.0 | 2.0 | 2.0 | 2.0 | 2.0 | 2.0 | 2.0 | 2.0 | 2.0 | 2.0 |
| Total | | 100 | 100 | 100 | 100 | 100 | 100 | 100 | 100 | 100 | 100 |
| Energy for temporary curing | | 30.0 | 20.0 | 10.0 | 5.0 | 2.9 | 2.5 | 10.0 | 10.0 | 10.0 | 10.0 |
| Energy for main curing | | 350 | 350 | 350 | 350 | 350 | 350 | 90 | 120 | 180 | 700 |
| Energy for main curing/ Energy for temporary curing | | 11.7 | 17.5 | 35.0 | 70.0 | 119.9 | 140.0 | 9.0 | 12.0 | 18.0 | 70.0 |
| Cleaning process | | 1 | 1 | 1 | 1 | 1 | 1 | 1 | 1 | 1 | 1 |
| Wrinkles | | C | C | C | C | B | B | B | C | C | C |
| Storage stability | | A | A | A | A | A | A | A | A | A | A |
| Bleeding | | A | A | A | A | B | C | B | A | A | A |
| Streaks | | A | A | A | A | A | A | A | A | A | A |
| Tackiness | | A | A | A | A | A | A | C | B | A | A |
| Cleaning resettability | | A | A | A | A | A | A | A | A | A | A |

TABLE 3

|  |  | Examples | | | | | | | Comparative Examples | | | | | | | | |
|---|---|---|---|---|---|---|---|---|---|---|---|---|---|---|---|---|
|  |  | 41 | 42 | 43 | 44 | 45 | 46 | 47 | 1 | 2 | 3 | 4 | 5 | 6 | 7 | 8 | 9 |
| Pigment | C. I. pigment black 7 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Dispersant | Solspers 36000 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Polymerizable | VEEA | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |

TABLE 3-continued

|  |  | Examples |  |  |  |  |  |  | Comparative Examples |  |  |  |  |  |  |  |  |
|---|---|---|---|---|---|---|---|---|---|---|---|---|---|---|---|---|---|
|  |  | 41 | 42 | 43 | 44 | 45 | 46 | 47 | 1 | 2 | 3 | 4 | 5 | 6 | 7 | 8 | 9 |
| compound | PEA | 54.3 | 54.3 | 14.3 | 29.8 | 29.8 | 29.8 | 29.8 | 64.8 | 29.9 | 64.9 | 30.0 | 30.0 | 30.0 | 64.9 | 29.8 | 64.8 |
|  | DPGDA | 10.0 | 10.0 | 50.0 | 35.0 | 30.0 | 30.0 | 35.0 |  | 35.0 |  | 34.8 | 34.8 | 34.8 |  | 35.0 |  |
|  | TPGDA |  |  |  |  |  |  |  |  |  |  |  |  |  |  |  |  |
|  | V#335HP |  |  |  |  |  |  |  |  |  |  |  |  |  |  |  |  |
|  | A-TMPT |  |  |  |  | 5.0 | 5.0 |  |  |  |  |  |  |  |  |  |  |
| Hindered amine compound | TINUVIN 144 |  |  |  |  |  |  |  |  |  |  |  |  |  |  |  |  |
|  | LA 82 |  |  |  |  |  |  |  |  |  |  |  |  |  |  |  |  |
|  | LA-7RD | 0.6 | 0.6 | 0.6 | 0.1 | 0.1 | 0.1 | 0.1 | 0.1 |  |  | 0.1 | 0.1 | 0.1 |  | 0.1 | 0.1 |
| Other polymerization inhibitor | MEHQ | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Polymerization initiator | Irgacure 819 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
|  | Irgacure TPO | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
|  | Irgacure 369 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Total |  | 100 | 100 | 100 | 100 | 100 | 100 | 100 | 100 | 100 | 100 | 100 | 100 | 100 | 100 | 100 | 100 |
| Energy for temporary curing |  | 10.0 | 10.0 | 10.0 | 10.0 | 10.0 | 10.0 | 40.0 | 10.0 | 10.0 | 10.0 | 10.0 | 350.0 |  | 350.0 | 10.0 | 10.0 |
| Energy for main curing |  | 1200 | 1400 | 350 | 350 | 350 | 350 | 350 | 350 | 350 | 350 |  |  | 350 |  | 350 | 350 |
| Energy for main curing/ Energy for temporary curing |  | 120.0 | 140.0 | 35.0 | 35.0 | 35.0 | 35.0 | 8.8 | 35.0 | 35.0 | 35.0 | 0.0 | 0.0 | — | 0.0 | 35.0 | 35.0 |
| Cleaning process |  | 1 | 1 | 1 | 2 | 4 | 2 | 2 | 1 | 1 | 1 | 1 | 1 | 1 | 1 | 3 | 3 |
| Wrinkles |  | C | C | A | A | A | A | A | D | A | B | A | A | A | A | A | D |
| Storage stability |  | A | A | B | A | A | A | A | A | D | D | A | A | A | D | A | A |
| Bleeding |  | A | A | A | A | A | A | A | B | A | A | D | A | D | A | B | B |
| Streaks |  | A | A | B | A | A | A | C | A | A | A | A | D | A | D | A | A |
| Tackiness |  | A | A | A | A | A | A | A | A | A | A | D | A | A | A | A | A |
| Cleaning resettability |  | A | B | B | A | B | A | C | A | A | A | A | D | A | D | D | C |

It was found from Examples 1 to 47 that, according to the present embodiment, storage stability, suppression of wrinkles, suppression of bleeding, suppression of streaks, tackiness, and cleaning resettability were excellent. Comparing Examples 30 to 42 with other Examples, it was found that a polymerizable compound having a di- or higher functional (meth)acryloyl group is effective in terms of suppressing the generation of wrinkles. Meanwhile, comparing Example 43 with other Examples, it was found that, when the content of a polymerizable compound having a di-functional (meth)acryloyl group is lower, the solubility of an initiator is improved, and storage stability becomes better.

It was found from Examples 45 and 46 that, even when the ink composition contains a polymerizable compound having a tri- or higher functional (meth)acryloyl group, when a cleaning process including wiping is performed, cleaning resettability becomes excellent, and, particularly, a cleaning process including wiping using a cleaning liquid is further improved.

It was found from Comparative Examples 2 and 3 that, when the ink composition does not contain a hindered amine compound, the generation of wrinkles can be suppressed, whereas storage stability remarkably deteriorates. Meanwhile, wrinkles occur when a film of an ink composition adhered to a recording medium is cured by irradiation. In this case, when the surface of the film is cured first and then the inside of the film is cured, the surface of the film becomes wrinkled. Further, it is assumed that marked wrinkling is generated because the curing of the inside of the film is further delayed by a hindered amine compound. However, the cause of the generation of wrinkles is not limited thereto.

It was found from Comparative Example 4 that, when only temporary curing is performed without performing main curing, bleeding occurs, and tackiness is lower.

It was found from Comparative Examples 5 and 7 that, when main curing is performed at a temporary curing position, streaks occur, cleaning resettability deteriorates, and wrinkles are suppressed.

It was found from Comparative Example 6 that, when main curing is performed without performing temporary curing, bleeding occurs.

It was found from Comparative Example 8 that, when a cleaning process including wiping is not performed, a poor discharge nozzle is generated within 1 hour. Meanwhile, it was found from Comparative Example 9 that, when the ink composition does not contain a polymerizable compound having a di-functional (meth)acryloyl group and a cleaning process is not performed, the generation of poor discharge nozzles is comparatively suppressed, but wrinkles are generated.

The entire disclosure of Japanese Patent Application No.: 2013-253923, filed Dec. 9, 2013 is expressly incorporated by reference herein.

What is claimed is:

1. An ink jet recording method, comprising:
   scanning a recording medium with an ink jet head and simultaneously discharging an ultraviolet-curable ink composition from the ink jet head to adhere the ink composition to the recording medium;
   irradiating the ultraviolet-curable ink composition adhered to the recording medium with at least a first ultraviolet irradiation and a second or subsequent ultraviolet irradiation; and
   wiping a nozzle of the ink jet head, from which the ultraviolet-curable ink composition has been discharged, using a nozzle wiping member,
   wherein the ultraviolet-curable ink composition contains a color material, a polymerizable compound having a di- or higher functional (meth)acryloyl group, a photopolymerization initiator, and a hindered amine compound,
   wherein the energy of the first ultraviolet irradiation is less than the energy of the second or subsequent ultraviolet irradiation, wherein the first ultraviolet irradiation is performed downstream of the recording medium transporting direction past the ink jet head and the second ultraviolet irradiation is performed on the downstream side of the recording medium transporting direction past the position at which the first ultraviolet irradiation is performed, and wherein an irradiation intensity of a light source in the second Of subsequent ultraviolet irradiation is 5 mW/cm$^2$ to 2000 mW/cm$^2$.

2. The ink jet recording method according to claim 1, wherein the content of the hindered amine compound is 0.005 mass % to 0.5 mass %, based on 100 mass % of the ultraviolet curable ink composition.

3. The ink jet recording method according to claim 1, wherein the energy of the first ultraviolet irradiation is 2.5 mJ/cm$^2$ to 40 mJ/cm$^2$, and a total ultraviolet irradiation energy is 100 mJ/cm$^2$ to 1500 mJ/cm$^2$.

4. The ink jet recording method according to claim 1, wherein, in the irradiating, at least a light source used in the first ultraviolet irradiation is a semiconductor light source having a peak wavelength of 350 nm to 420 nm.

5. The ink jet recording method according to claim 1, wherein, in the irradiating, at least a light source used in the first ultraviolet irradiation is an LED having a peak wavelength of 350 nm to 420 nm.

6. The ink jet recording method according to claim 1, wherein the content of the polymerizable compound having a di- or higher functional (meth)acryloyl group is 5 mass % to 60 mass %, based on 100 mass % of the ultraviolet-curable ink composition.

7. The ink jet recording method according to claim 1, wherein, in the scanning, recording is performed by scanning the recording medium one time with an ink jet head having a length equal to or greater than a recording width of the recording medium.

8. The ink jet recording method according to claim 1, wherein the ultraviolet-curable ink composition contains a polymerizable compound having a tri- or higher functional (meth)acryloyl group.

9. The ink jet recording method according to claim 1, wherein, in the wiping, the nozzle is wiped by the nozzle wiping member using a cleaning liquid containing an alkylene glycol derivative.

10. The ink jet recording method according to claim 1, wherein a total energy of the second or subsequent ultraviolet irradiation is 8 times to 140 times the first ultraviolet irradiation energy.

11. The ink jet recording method according to claim 1, wherein the hindered amine compound includes a compound having a 2,2,6,6 tetramethylpiperidine-N-oxyl skeleton.

12. An ink jet apparatus, which performs recording by the ink jet method according to claim 1.

13. An ink jet apparatus, which performs recording by the ink jet method according to claim 2.

14. An ink jet apparatus, which performs recording by the ink jet method according to claim 3.

15. An ink jet apparatus, which performs recording by the ink jet method according to claim 4.

16. An ink jet apparatus, which performs recording by the ink jet method according to claim 5.

17. The ink jet recording method according to claim 1, wherein the scanning is performed by transporting the recording medium in a scanning direction or moving the ink jet head in a main scanning direction.

18. The ink jet recording method according to claim 1, wherein the scanning is performed by transporting the recording medium in a scanning direction.

19. The ink jet recording method according to claim 1, wherein at least the first ultraviolet irradiation of the irradiation step is ultraviolet radiation for temporary curing.

20. The ink jet recording method according to claim 1, wherein the ultraviolet-curable ink composition is cured by at least the first ultraviolet irradiation and the second or subsequent ultraviolet irradiation, and this is the main curing of the ultraviolet-curable ink composition.

21. The ink jet recording method according to claim 1, wherein the recording medium transporting direction is the scanning direction.

22. The ink jet recording method according to claim 1, wherein an intensity of the first ultraviolet irradiation is 5 mW/cm$^2$ to 100 mW/cm$^2$ and an intensity of the second or subsequent ultraviolet irradiation is 350 mW/cm$^2$ to 2000 mW/cm$^2$.

* * * * *